(12) United States Patent
Nakamura et al.

(10) Patent No.: US 9,766,653 B2
(45) Date of Patent: Sep. 19, 2017

(54) DISPLAY AND ELECTRONIC UNIT

(71) Applicant: SONY CORPORATION, Tokyo (JP)

(72) Inventors: Hirofumi Nakamura, Kanagawa (JP);
Nobuhide Yoneya, Kanagawa (JP);
Toru Tanikawa, Kanagawa (JP); Shota Nishi, Kanagawa (JP); Shin Akasaka, Kanagawa (JP); Satoshi Kumon, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/740,959

(22) Filed: Jun. 16, 2015

(65) Prior Publication Data

US 2015/0277486 A1    Oct. 1, 2015

Related U.S. Application Data

(63) Continuation of application No. 13/551,233, filed on Jul. 17, 2012, now Pat. No. 9,110,313.

(30) Foreign Application Priority Data

Jul. 29, 2011 (JP) .................. 2011-166667

(51) Int. Cl.
| | |
|---|---|
| G02F 1/1339 | (2006.01) |
| G06F 1/16 | (2006.01) |
| G02B 6/08 | (2006.01) |
| G02F 1/1335 | (2006.01) |
| G02F 1/01 | (2006.01) |
| G02F 1/1333 | (2006.01) |
| B32B 3/30 | (2006.01) |
| B32B 7/14 | (2006.01) |

(52) U.S. Cl.
CPC .................. *G06F 1/16* (2013.01); *B32B 3/30* (2013.01); *B32B 7/14* (2013.01); *G02B 6/08* (2013.01); *G02F 1/0107* (2013.01); *G02F 1/1339* (2013.01); *G02F 1/133308* (2013.01); *G02F 1/133524* (2013.01); *B32B 2457/20* (2013.01); *G02F 2001/133311* (2013.01); *Y10T 428/24488* (2015.01); *Y10T 428/24752* (2015.01)

(58) Field of Classification Search
CPC ............. G02F 1/133524; G02F 1/1339; G02F 1/13458; G02F 1/13452; G02F 1/1341; G02B 6/08
USPC .................................................. 349/159, 187
See application file for complete search history.

(56) References Cited

U.S. PATENT DOCUMENTS

| | | | | |
|---|---|---|---|---|
| 2003/0197829 | A1* | 10/2003 | Liang .................... | G02F 1/1341 349/187 |
| 2006/0072063 | A1* | 4/2006 | Kim ........................ | B82Y 20/00 349/156 |
| 2010/0167597 | A1* | 7/2010 | Kumazawa ............ | H01R 13/52 439/709 |

(Continued)

*Primary Examiner* — Phu Vu
(74) *Attorney, Agent, or Firm* — Chip Law Group

(57) ABSTRACT

There are provided a display in which a sealing section is prevented from being spread and the sealing section is allowed to be provided in a desired region, and an electronic unit including the display. The display includes: a substrate including a sealing region and a step section, the sealing region surrounding a display region, and the step section surrounding the sealing region from outside; a display layer provided in the display region; and a sealing section provided in the sealing region.

7 Claims, 9 Drawing Sheets

(56) References Cited

U.S. PATENT DOCUMENTS

2010/0195039 A1\* 8/2010 Park ................ B23K 26/08
                                              349/152
2012/0019763 A1\* 1/2012 Kang ................ G02F 1/1333
                                              349/153

\* cited by examiner

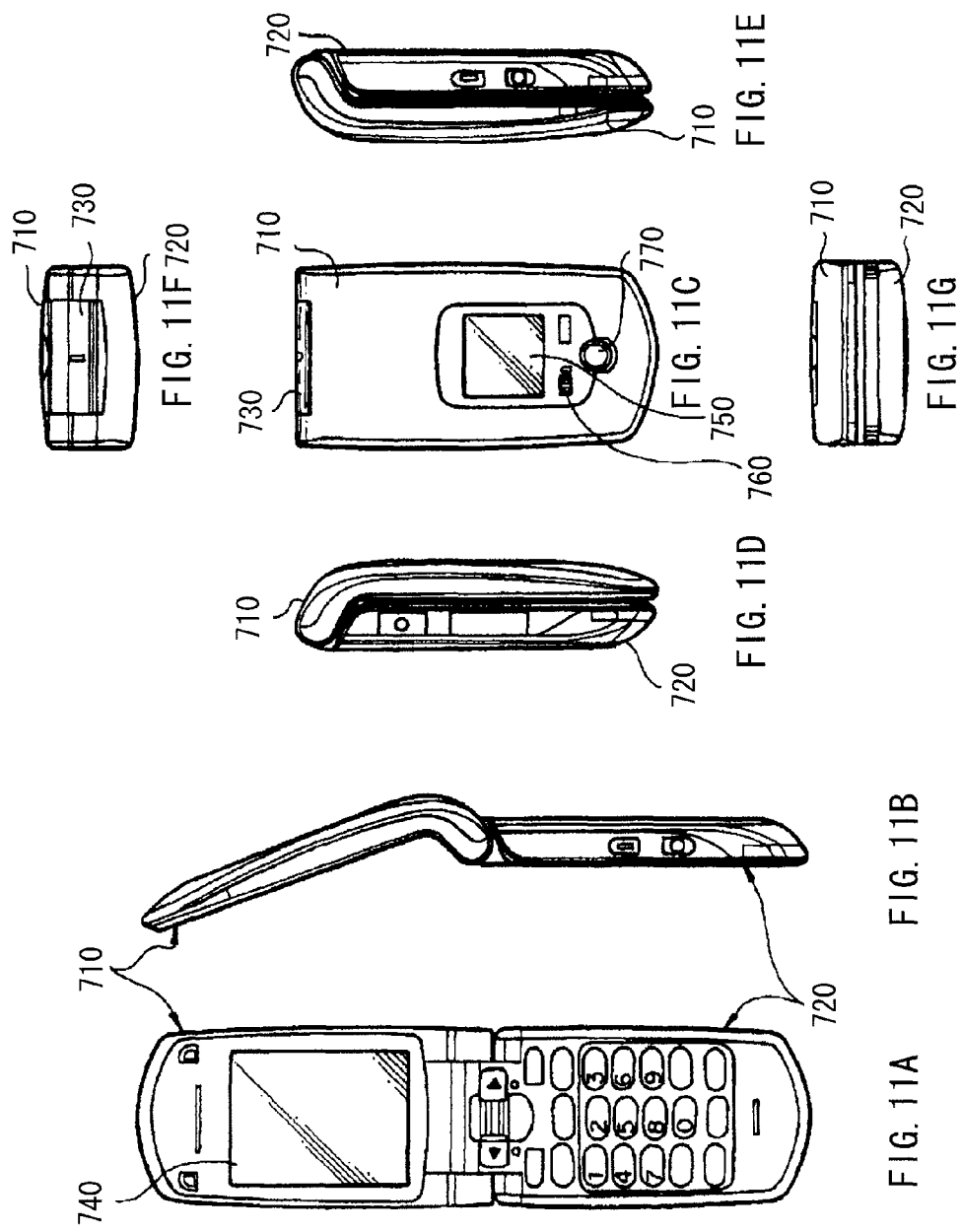

DISPLAY AND ELECTRONIC UNIT

CROSS REFERENCE TO RELATED APPLICATIONS

The present disclosure is a continuation application of U.S. patent application Ser. No. 13/551,233 filed in the USPTO on Jul. 17, 2012, which claims priority from Japanese Priority Patent Application 2011-166667 filed in the Japanese Patent Office on Jul. 29, 2011. Each of the above referenced applications is hereby incorporated by reference in its entirety.

BACKGROUND

The present technology relates to a display in which dampproof characteristics are improved by providing a sealing section around a display layer and an electronic unit including the display.

Currently, a liquid crystal display is widely used as a plane display such as a television. In addition, a display in which its thickness and power consumption are allowed to be further decreased has attracted attention.

In such a display, a dampproof function with respect to a display layer is important for the following reason. First, most display layers are easily deteriorated due to moisture. Next, compared to in an organic EL (electroluminescence) display or the like, in the display having a large thickness of the display layer (thickness in its lamination direction), if a dampproof action of the organic EL display or the like is applied thereto as it is, moisture intrusion from a side surface of the display layer is not sufficiently prevented. Therefore, the display layer on a substrate is covered with a dampproof film with low moisture permeability (for example, moisture permeability equal to or less than $0.03 \text{ g/m}^2/\text{day}$), a sealing section is formed between the substrate and the dampproof film, and the side surface of the display layer is also covered with the sealing section (for reference, see Japanese Unexamined Patent Application Publication No. 2005-114820).

SUMMARY

In the foregoing case, however, a pre-hardened resin as a raw material of the sealing section is filled in a gap between the substrate and the dampproof film. Therefore, it is necessary to lower viscosity of the pre-hardened resin. Thereby, the pre-hardened resin is easily spread on the substrate, and there is a possibility that the sealing section affects a wiring section provided on the outer circumference of the substrate. Further, due to the spread pre-hardened resin, a frame area is increased.

In Japanese Unexamined Patent Application Publication No. 2007-073397, to prevent a pre-hardened resin from being spread on a substrate, the following method is proposed. In the method, an enclosure is formed around a display region by using a resin material different from that of a sealing section, and the sealing section is provided inside the enclosure. In the method, however, the resin material and increased working step time for forming the enclosure are necessitated. In addition, compatibility between respective resin materials forming the enclosure and the sealing section should be considered. Therefore, usable resin materials are limited.

It is desirable to provide a display in which a sealing section is prevented from being spread and the sealing section is allowed to be provided in a desired region and an electronic unit including the display.

According to an embodiment of the present technology, there is provided a display including: a substrate including a sealing region and a step section, the sealing region surrounding a display region, and the step section surrounding the sealing region from outside; a display layer provided in the display region; and a sealing section provided in the sealing region.

According to an embodiment of the present technology, there is provided an electronic unit including a display. The display includes: a substrate including a sealing region and a step section, the sealing region surrounding a display region, and the step section surrounding the sealing region from outside; a display layer provided in the display region; and a sealing section provided in the sealing region.

In the display according to the embodiment of the present technology or the electronic unit according to the embodiment of the present technology, the step section is provided in the substrate. Therefore, there is no possibility that the sealing section is spread outside of the step section, and the sealing section is provided in a desired region.

According to the display according to the embodiment of the present technology and the electronic unit according to the embodiment of the present technology, the step section is provided in the substrate. Therefore, the sealing region is allowed to be provided in a desired region. Accordingly, a region other than the sealing region, for example, a wiring section provided on the outer circumference of the substrate is allowed to be prevented from being affected by the sealing section, and the frame area of the display is allowed to be narrowed.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 11A is an elevation view of a sixth application example unclosed, FIG. 11B is a side view thereof, FIG. 11C is an elevation view of the sixth application example closed, FIG. 11D is a left side view thereof, FIG. 11E is a right side view thereof, FIG. 11F is a top view thereof, and FIG. 11G is a bottom view thereof.

DETAILED DESCRIPTION

An embodiment of the present technology will be hereinafter described in detail with reference to the drawings. The description will be given in the following order.
1. Embodiment
Display including a substrate having a step section
2. Modification
Display having a plurality of step sections in a substrate
3. Application Examples

Embodiment

Figure 1:
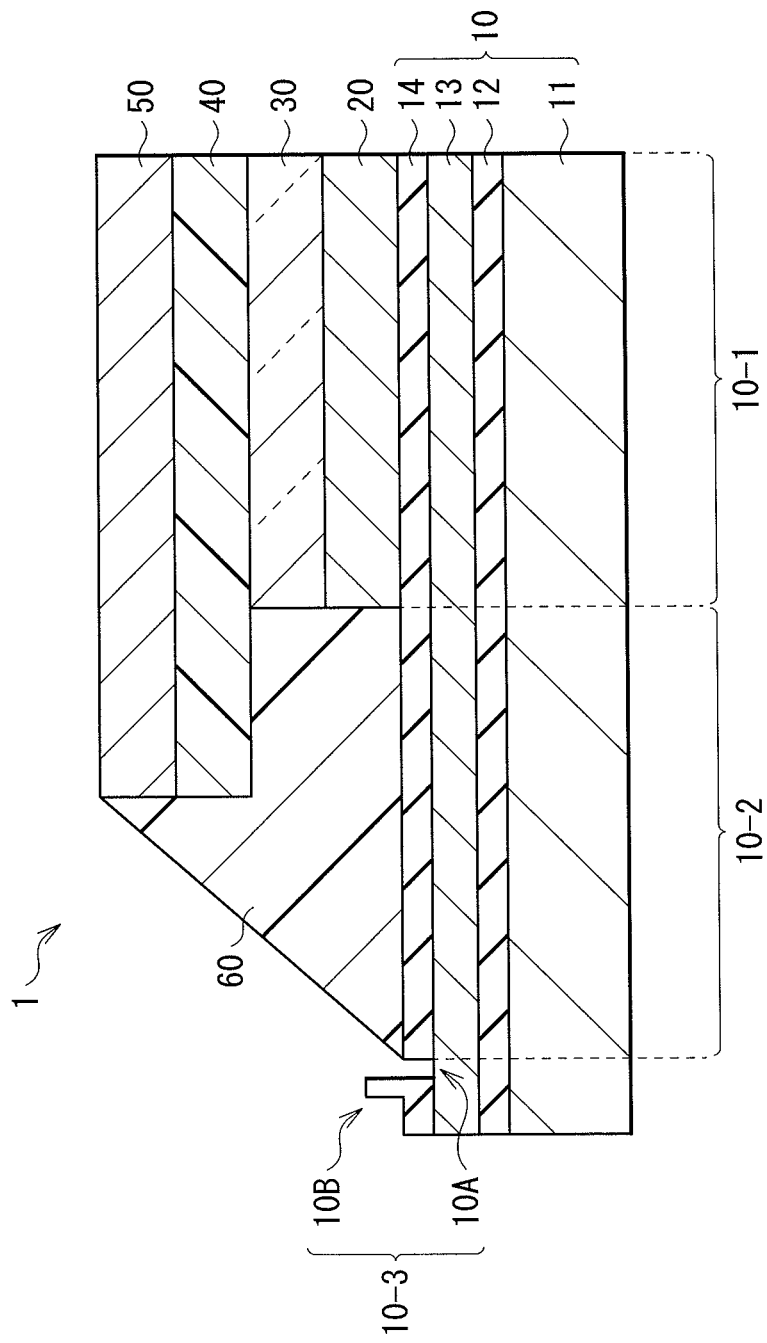
FIG. 1 is a cross-sectional side view illustrating a configuration of a display according to an embodiment of the present disclosure.

FIG. 1 illustrates a cross-sectional configuration of a display (display 1) according to an embodiment of the present disclosure. The display 1 is, for example, an electronic paperless display. The display 1 has a display layer 20, an opposed substrate 30, a dampproof film 40, and an optical function film 50 on a drive substrate 10 (substrate) in this order. A side surface of a lamination section from the display layer 20 to the optical function film 50 is covered with a sealing section 60. FIG. 1 schematically illustrates a structure of the display 1, and in some cases, dimensions and shapes thereof are different from actual dimensions and actual shapes.

The drive substrate 10 has a base substance 11, a barrier layer 12, a TFT layer 13, and a planarizing layer 14 in this order. The display layer 20 is provided on the planarizing layer 14. As illustrate in FIG. 2, the drive substrate 10 has a display region 10-1 in the central section, a sealing region 10-2 that is adjacent to the display region 10-1 and surrounds the display region 10-1, and a step section 10-3 located outside of the sealing region 10-2 (on the side opposite to the display region 10-1 with respect to the sealing region 10-2). The display layer 20 and the opposed substrate 30 are provided in the display region 10-1, and the sealing section 60 is provided in the sealing region 10-2. A wiring section (not illustrated) for supplying a signal from outside is provided on the outer circumference of the drive substrate 10.

The base substance 11 is made of, for example, an inorganic material such as glass, quartz, silicon, and gallium arsenic; or a plastic material such as polyimide, polyethylene terephthalate (PET), polyethylene naphthalate (PEN), polymethyl methacrylate (PMMA), polycarbonate (PC), polyether sulfone (PES), polyethyl ether ketone (PEEK), and aromatic polyester (liquid crystal polymer). The base substance 11 may be a wafer having rigidity, or may be thin layer glass and a film having flexibility. As long as the base substance 11 has flexibility, a display capable of being bent is allowed to be realized.

The barrier layer 12 is an $AlO_xN_{1-x}$ (where x is from 0.01 to 0.2 both inclusive) film or a silicon nitride ($Si_3N_4$) film formed by, for example, a CVD (chemical vapor deposition) method. The barrier layer 12 prevents deterioration of the TFT layer 13 and the display layer 20 due to moisture or organic gas.

The TFT layer 13 has a switching function for selecting a pixel. The TFT layer 13 may be formed of an inorganic TFT using an inorganic semiconductor layer as a channel layer, or may be formed of an organic TFT using an organic semiconductor layer.

Out of the drive substrate 10, the planarizing layer 14 arranged on a surface opposed to the display layer 20, that is, on the TFT layer 13 is intended to modify a step created by wiring of the TFT layer 13 or the like. The planarizing layer 14 is made of, for example, acryl, polyimide, or the like. The step section 10-3 is provided in the planarizing layer 14.

Figure 2:
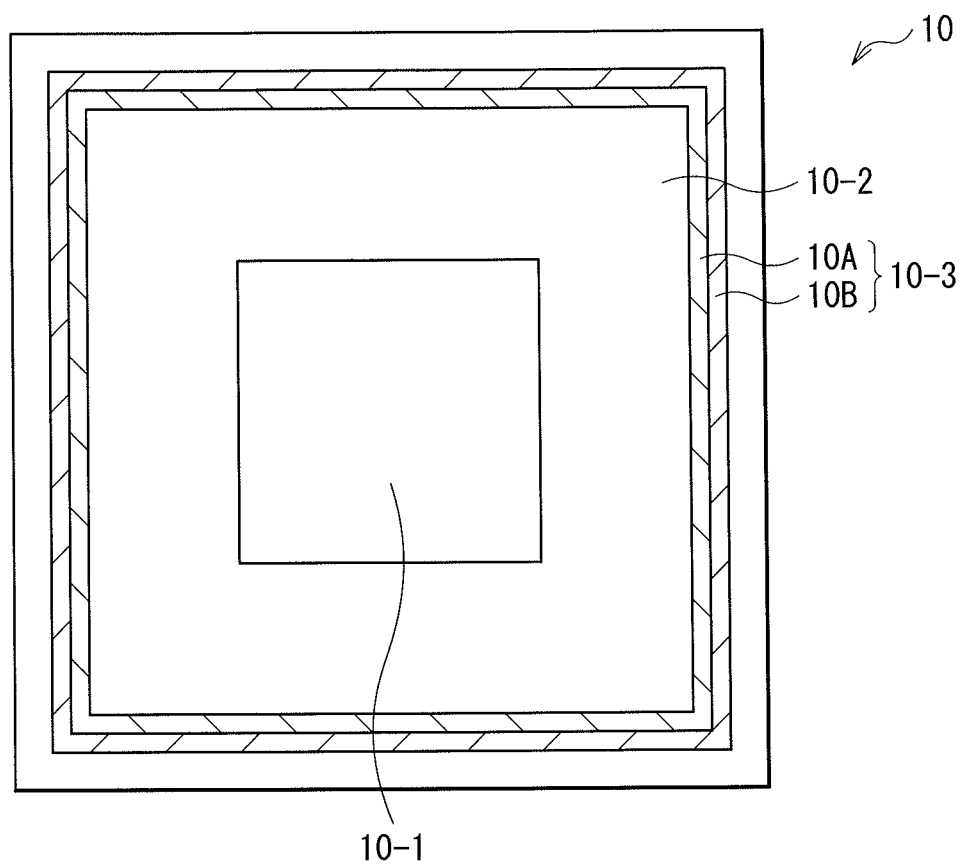
FIG. 2 is a plan view illustrating a configuration of the display illustrated in FIG. 1.

The step section 10-3 is intended to desirably define a region of the sealing region 10-2, and is provided in a location surrounding the sealing region 10-2. As illustrated in FIG. 2, in this embodiment, the step section 10-3 continuously surrounds the sealing region 10-2. However, as long as the region of the sealing region 10-2 is allowed to be defined, part of the step section 10-3 may be segmentalized. In forming the sealing section 60, a pre-hardened resin as a raw material of the sealing section 60 is allowed to be prevented from being spread outside beyond a desired region by the step section 10-3. The step section 10-3 includes a trench 10A (groove) having a certain depth from the surface of the drive substrate 10 and a rib 10B (protruded wall) that protrudes from the surface of the drive substrate 10. It is allowable that the sealing section 60 (resin) intrudes into inside of the trench 10A, and the sealing region 10-2 and the step section 10-3 are partly overlapped. For example, a thickness of the planarizing layer 14 in the sealing region 10-2 is about 10 μm. The trench 10A and the rib 10B (step section 10-3) are formed by providing a groove and a protruded wall each being about 3 μm thick with respect to the sealing region 10-2. As illustrated in FIG. 1, the planarizing layer 14 may be segmentalized by the trench 10A.

In the step section 10-3, in order to improve water repellency, the planarizing layer 14 is subjected to, for example, silica-based surface treatment. Meanwhile, the sealing region 10-2 is subjected to surface treatment for improving wettability such as oxygen plasma treatment. Specifically, in the sealing region 10-2, the resin forming the sealing section 60 blends therewith and is easily spread. Meanwhile, in the step section 10-3, the resin forming the sealing section 60 is shed. Therefore, the sealing section 60 is allowed to be provided in a desired region more securely.

The display layer 20 has a display body between a pixel electrode and a common electrode. The pixel electrode is contacted with the planarizing layer 14, and the common electrode is contacted with the opposed substrate 30. A thickness in the lamination direction of the display layer 20 is, for example, about from 40 μm to 165 μm both inclusive. The pixel electrode is provided for every pixel, and is composed of, for example, a single element or an alloy of metal elements such as chromium (Cr), gold (Au), platinum (Pt), nickel (Ni), copper (Cu), tungsten (W), aluminum (Al), and silver (Ag). The common electrode is provided over one surface of the opposed substrate 30, and is made of, for example, a translucent conductive material (transparent electrode material) such as indium oxide-tin oxide (ITO), antimony oxide-tin oxide (ATO), fluorine-doped tin oxide (FTO), and aluminum-doped zinc oxide (AZO).

In this embodiment, since an image is displayed on the opposed substrate 30 side, an optically-transparent material is used for the opposed substrate 30. Except for this point, a material similar to that of the substrate 10 may be used.

The dampproof film 40 is intended to prevent moisture intrusion into the display layer 20, and exists between the display layer 20 and the optical function film 50 as the uppermost surface. The opposed substrate 30 is adhered to the dampproof film 40 by, for example, a pressure sensitive adhesive, a heat sensitive adhesive, or the like. The dampproof film 40 is made of polyethylene terephthalate, polymethylmethacrylate, polycarbonate, polyethylene naphthalate, polypropylene, nylon-6, nylon-66, polyvinylidene chloride, polyether sulfone, or the like. It is preferable that the dampproof film 40 have dampproof characteristics, for example, moisture permeability of from 0.1 $g/m^2$/day to 0.000001 $g/m^2$/day both inclusive, and preferably a value equal to or less than 0.03 $g/m^2$/day, and have high optical transparency.

In the display 1, the dampproof film 40 and the optical function film 50 are larger than the display region 10-1 (the display layer 20 and the opposed substrate 30), and end surfaces thereof are thrown out to the sealing region 10-2 side (outside). Thereby, a gap is created between the dampproof film 40 and the drive substrate 10, and a canopy-like structure is formed.

The optical function film 50 is intended to prevent, for example, reflection of outside light on the display surface, and is arranged to be opposed to the display surface of the display layer 20 with the dampproof film 40 in between. The optical function film 50 is bonded with the dampproof film 40 by an adhesive (not illustrated). Specifically, the optical function film 50 has an antireflection function or a glare-proof function. For example, in the case where the optical function film 50 has the antireflection function, the optical function film 50 is a laminated body formed of a plurality of thin films each having a different refractive index, in which reflected light is attenuated by using interference of reflected light generated on a boundary face between these thin films. Further, for example, in the case where the optical function film 50 has the glare-proof function, a concavo-convex surface is formed on the surface of the optical function film 50 by paint, and outside light is irregularly reflected by the concavo-convex surface. Instead of the optical function film 50, a film to protect the display surface from physical impulse (external force) such as a hard coating may be formed as a surface film.

The sealing section 60 is provided on the drive substrate 10 to cover respective end surfaces of the display layer 20, the opposed substrate 30, the dampproof film 40, and the optical function film 50. In other words, the sealing section 60 is provided to surround circumferences of the display layer 20, the opposed substrate 30, the dampproof film 40, and the optical function film 50. The sealing section 60 preferably seals the end section of the display 1 and prevents moisture intrusion from the side surface thereof. The sealing section 60 is made of a thermosetting acrylic-based resin, an ultraviolet-curable acrylic-based resin, a thermosetting methacrylic-based resin, an ultraviolet-curable methacrylic-based resin, a thermosetting epoxy resin, an ultraviolet-curable epoxy resin, or the like.

[Method of Manufacturing Display 1]

The display 1 is allowed to be manufactured, for example, as follows.

First, for example, high-frequency sputtering with the use of silicon as a target is performed while nitrogen gas is introduced, and thereby the barrier layer 12 made of silicon nitride is formed on the base substance 11. Next, the foregoing TFT layer 13 is formed on the barrier layer 12, and an organic film made of acryl is formed on the TFT layer 13. The trench 10A and the rib 10B (step section 10-3) are provided in the organic film by, for example, a lithography method or an etching method to form the planarizing layer 14. Thereby, the drive substrate 10 is formed. The sealing region 10-2 of the drive substrate 10 (planarizing layer 14) is subjected to oxygen plasma treatment, and the step section 10-3 of the drive substrate 10 (planarizing layer 14) is subjected to silica-based surface treatment.

After the drive substrate 10 is formed, a metal film composed of, for example, chromium, gold, platinum, nickel, copper, tungsten, or silver is formed on the whole surface of the drive substrate 10, the formed metal film is patterned, and thereby the pixel electrode is formed.

Next, the display body is formed on the opposed substrate 30 including the common electrode by, for example, coating. After that, the opposed substrate 30 is bonded with the drive substrate 10. Thereby, the display layer 20 and the opposed substrate 30 are formed on the drive substrate 10. The common electrode is previously formed by, for example, forming a film of ITO on the whole surface of one surface of the opposed substrate 30.

Subsequently, the dampproof film 40 is fixed onto the opposed substrate 30 by a transparent adhesive. At this time, as the dampproof film 40, a film in which all sides thereof are larger than a side of the display region 10-1 and its area is larger than an area of the display region 10-1 is used. Thereby, in the dampproof film 40, a section thrown out of the display region 10-1 is created, and a canopy-like structure is formed. After the dampproof film 40 is fixed onto the opposed substrate 30, the optical function film 50 is provided on the dampproof film 40. Alternately, the dampproof film 40 and the optical function film 50 may be previously adhered to the opposed substrate 30, and the opposed substrate 30 may be opposed to the drive substrate 10.

After the optical function film 50 is provided, the sealing section 60 is formed in the sealing region 10-2. A description will be given in detail of a formation step thereof.

Figure 3:
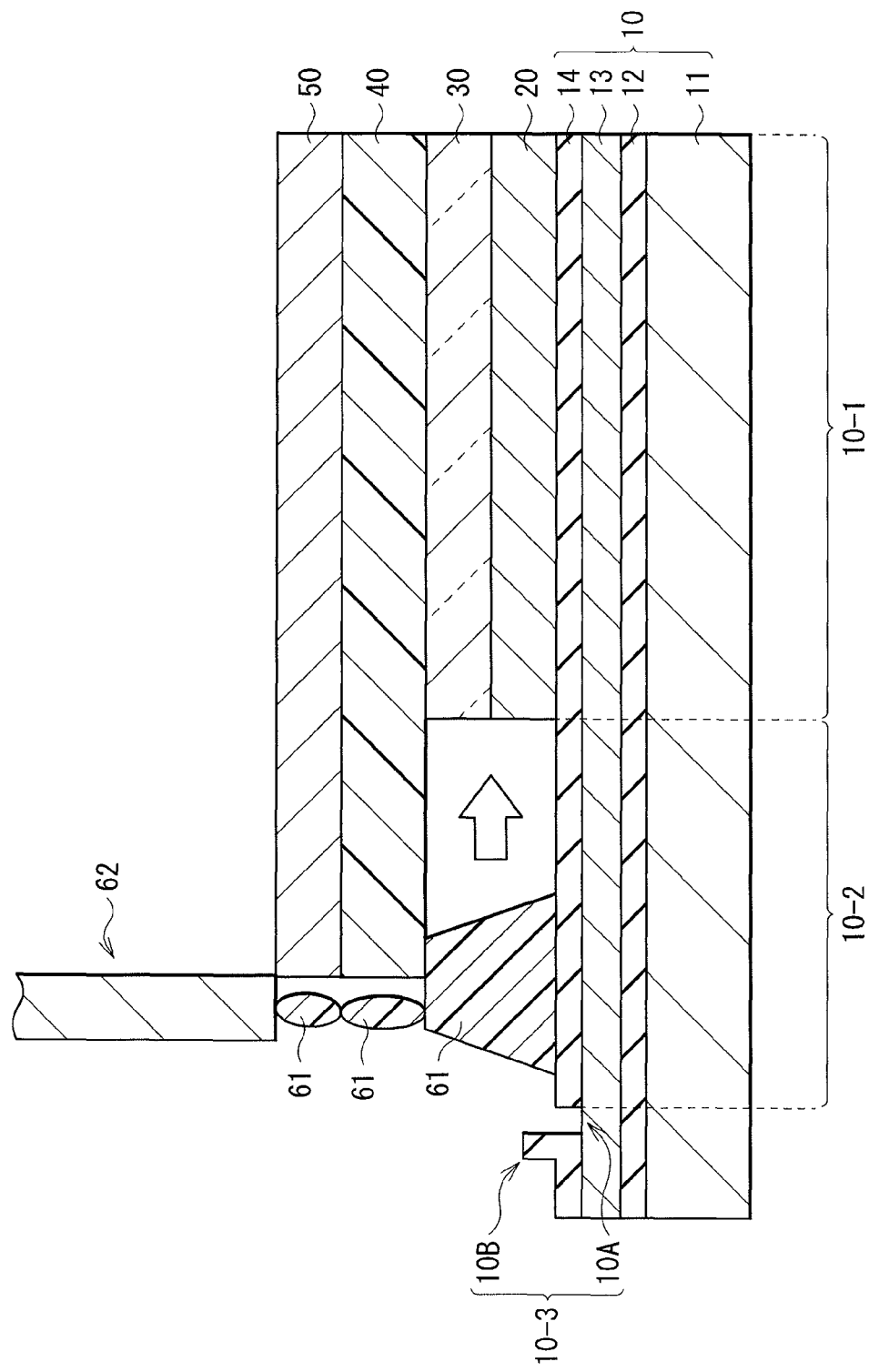
FIG. 3 is a cross-sectional side view illustrating one step of a method of manufacturing the display illustrated in FIG. 1.

In forming the sealing section 60, as illustrated in FIG. 3, first, a thermosetting resin or an ultraviolet-curable resin (pre-hardened resin 61) is filled in the gap between the dampproof film 40 and the drive substrate 10 by, for example, a needle 62. At this time, since the resin is filled in the gap by using capillary phenomenon of the pre-hardened resin 61, viscosity of the pre-hardened resin 61 should be low. The viscosity of the pre-hardened resin 61 is, for example, equal to or less than 10 (Pa·s), or is preferably equal to or less than 2 (Pa·s). The viscosity of the pre-hardened resin 61 is allowed to be adjusted by a resin component. Alternately, the viscosity of the pre-hardened resin 61 may be decreased by heating a syringe body (not illustrated) or the needle 62.

In the case where the viscosity of the pre-hardened resin 61 is low as described above, if the step section 10-3 is not provided, the pre-hardened resin 61 is easily spread on the drive substrate 10, and there is a possibility that the sealing section 60 is formed in a wide range beyond a desired region. The wiring section is provided on the outer circumference of the drive substrate 10. Therefore, if the pre-hardened resin 61 (sealing section 60) is spread to the wiring section, the wiring section is deteriorated, and reliability of the display is lowered. Further, in the case where the sealing section 60 is formed over a wide range, or in the case where a width of the sealing section 60 (distance from inside to outside of the sealing section 60) varies according to its position, a frame area of the display is increased, and design thereof is limited.

As in Japanese Unexamined Patent Application Publication No. 2007-073397, there is a possibility to adopt a method in which an enclosure is formed on the drive substrate 10 by a resin material different from that of the sealing section 60, and the pre-hardened resin 61 is filled inside of the enclosure. In such a method, however, the resin material and increased working step time for forming the enclosure are necessitated. In addition, compatibility between respective resin materials forming the enclosure and the sealing section should be considered Therefore, usable resin materials are limited.

Meanwhile, in this embodiment, since the step section 10-3 is provided in the drive substrate 10, the pre-hardened resin 61 (sealing section 60) is inhibited from being spread outside of the step section 10-3. Further, since the step section 10-3 is formed by performing lithography, etching, or the like on the planarizing layer 14. Therefore, the sealing section 60 (sealing region 10-2) is allowed to be provided in a desired region with the minimum number of types of resin materials to be used. Therefore, the sealing section 60 is not formed to the wiring section on the outer circumference of the drive substrate 10, and reliability of the display 1 is allowed to be improved. Further, since the frame area of the display is narrowed, design characteristics are improved.

Figure 4:
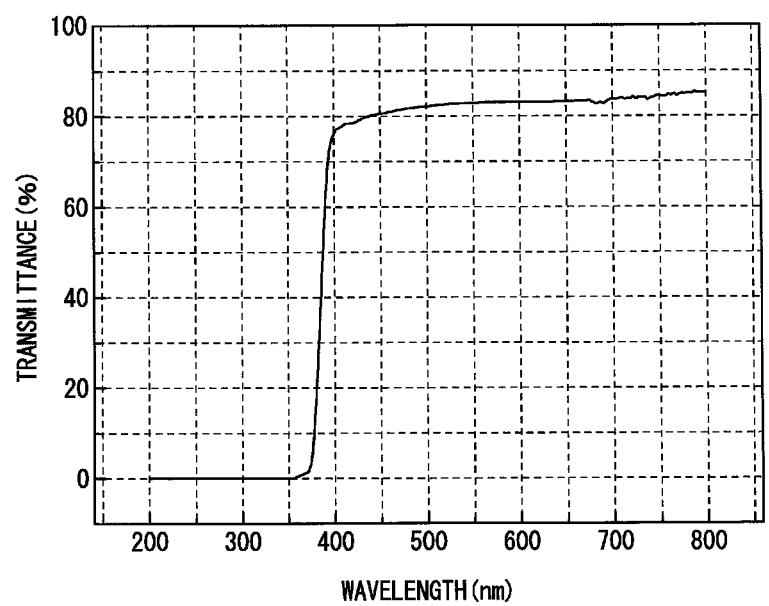
FIG. 4 is a diagram illustrating a relation between wavelength and transmittance in a film having an ultraviolet-screening function.

After the pre-hardened resin 61 is provided in the display region 10-2, the pre-hardened resin 61 is hardened by, for example, radiating heat or light to form the sealing section 60. Many of films used for the dampproof film 40 and the optical function film 50 have an ultraviolet-screening function. In the case where the dampproof film 40 and the optical function film 50 having the ultraviolet-screening function are used, the sealing section 60 is formed by using a resin material capable of being hardened by light in a range out of wavelength of screened ultraviolet. FIG. 4 illustrates an example of a relation between wavelength and light transmittance in the dampproof film 40 having the ultraviolet-screening function. In the case where such a dampproof film 40 is used, a resin material capable of being hardened by radiating light with wavelength longer than 380 nm (visible light) is used. To retain flexibility of the display 1, Young's modulus of the sealing section 60 (hardened resin) is preferably equal to or less than 500 (MPa), and is more preferably equal to or less than 100 (MPa). Accordingly, the display 1 illustrated in FIG. 1 is completed.

As described above, in the display 1 according to this embodiment, since the step section 10-3 is provided in the drive substrate 10, the sealing section 60 is inhibited from being spread, and the sealing region 10-2 (sealing section 60) is allowed to be provided in a desired region. Therefore, the wiring section on the outer circumference of the drive substrate 10 is prevented from being affected by the sealing section 60, and the frame area of the display is allowed to be narrowed.

Further, by performing surface treatment for improving wettability on the sealing region 10-2 of the drive substrate 10 and performing surface treatment for improving water repellency on the step section 10-3 of the drive substrate 10, a range of the sealing region 10-2 is allowed to be more securely defined.

Modification

Figure 5:
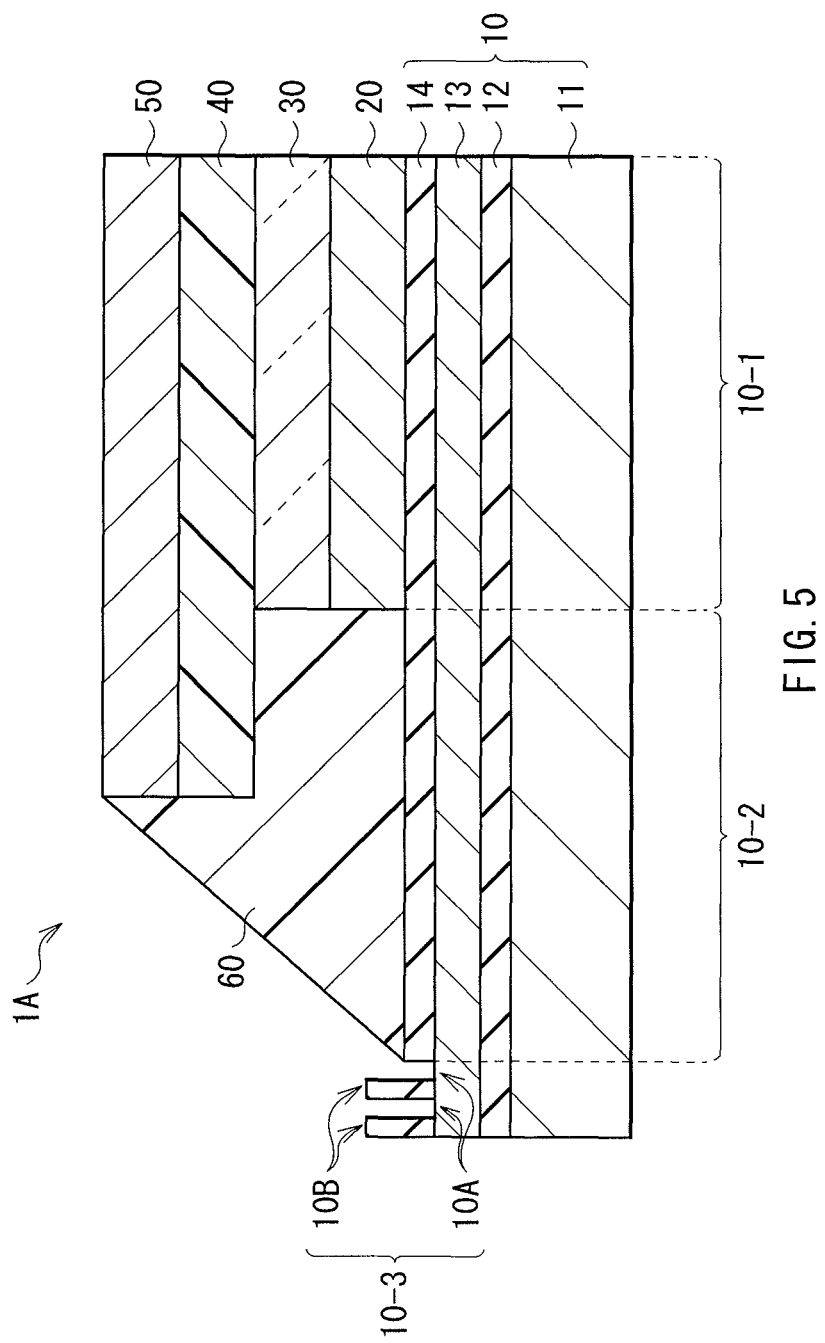
FIG. 5 is a cross-sectional side view illustrating a configuration of a modification of the display illustrated in FIG. 1.

FIG. 5 illustrates a cross-sectional configuration of a display 1A according to a modification. In the display 1A, the step section 10-3 includes a plurality of trenches 10A and a plurality of ribs 10B. Except for this point, the display 1A has a configuration similar to that of the display 1 according to the foregoing embodiment, and functions and effects thereof are similar to those of the display 1 according to the foregoing embodiment.

In the drive substrate 10 of the display 1A, the plurality of trenches 10A and the plurality of ribs 10B are provided. In this case, a case in which two trenches 10A and two ribs 10B are provided is illustrated as an example. By providing the plurality of trenches 10A and the plurality of ribs 10B as described above, the sealing section 60 is inhibited from being spread more securely.

The foregoing displays 1 and 1A are allowed to be mounted on, for example, electronic units illustrated in a first to a sixth application examples described below.

First Application Example

Figure 6A:
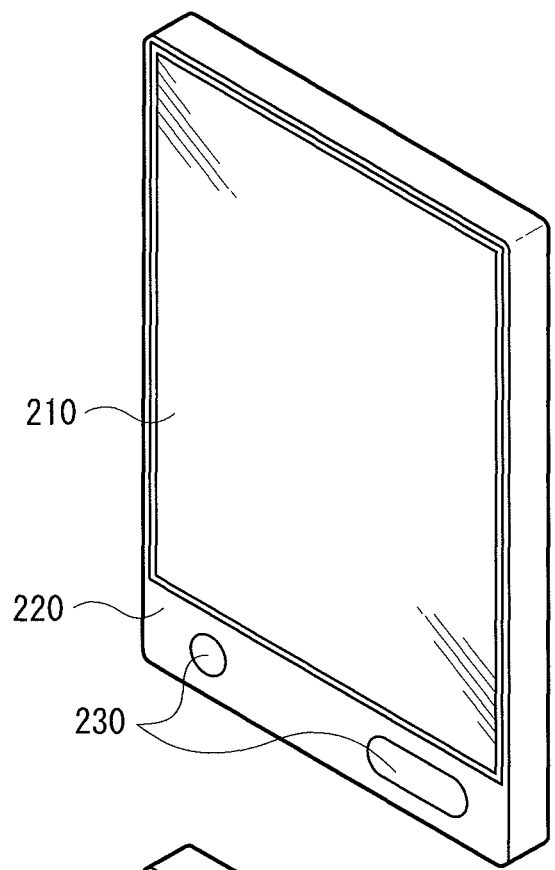
FIGS. 6A and 6B are perspective views illustrating appearances of a first application example.
Figure 6B:
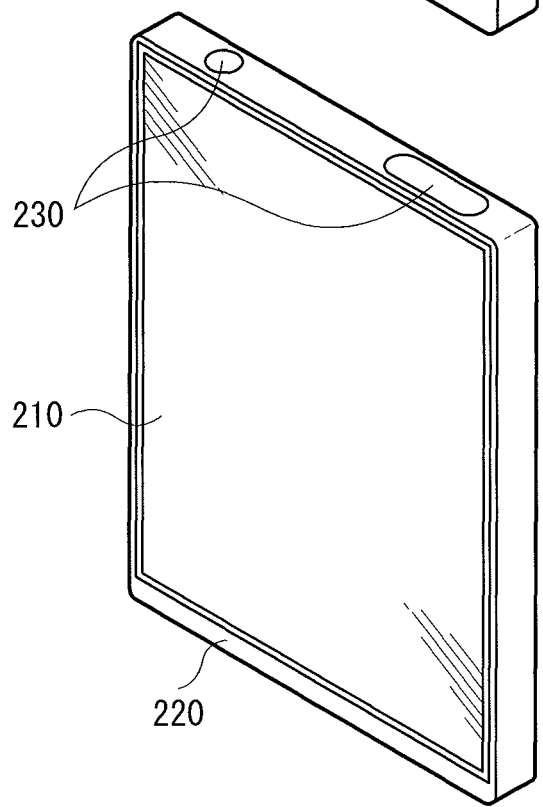

FIGS. 6A and 6B illustrate appearances of an electronic book. The electronic book has, for example, a display section 210, a non-display section 220, and an operation section 230. The operation section 230 may be provided on the same surface (front surface) as the surface on which the display section 210 is formed as illustrated in FIG. 6A. Alternatively, the operation section 230 may be provided on a surface (top surface) different from the surface on which the display section 210 is formed as illustrated in FIG. 6B.

Second Application Example

Figure 7:
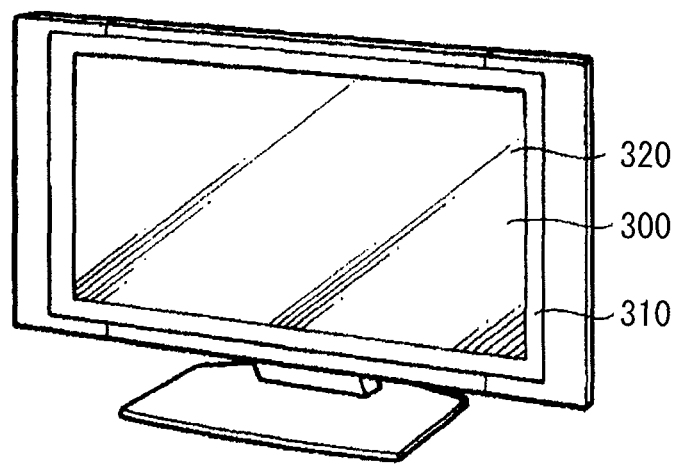
FIG. 7 is a perspective view illustrating an appearance of a second application example.

FIG. 7 illustrates an appearance of a television. The television has, for example, an image display screen section 300 including a front panel 310 and a filter glass 320.

Third Application Example

Figure 8A:
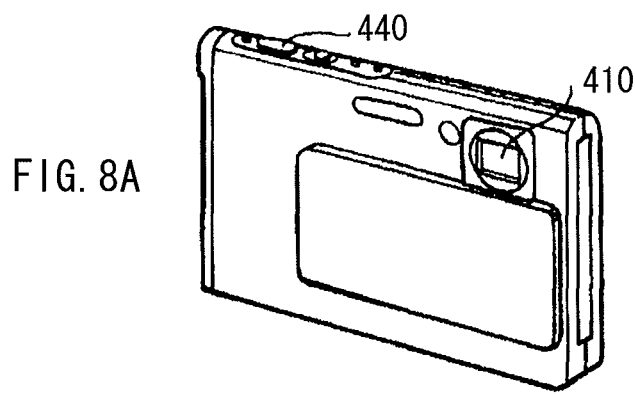
FIG. 8A is a perspective view illustrating an appearance of a third application example viewed from a front side thereof.
Figure 8B:
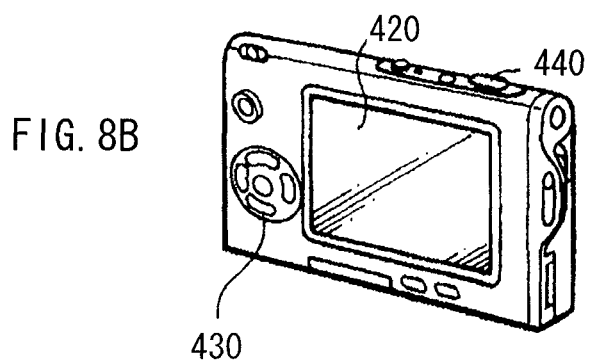
FIG. 8B is a perspective view illustrating an appearance of the third application example viewed from a rear side thereof.

FIGS. 8A and 8B illustrate appearances of a digital still camera. The digital still camera has, for example, a light emitting section for a flash 410, a display section 420, a menu switch 430, and a shutter button 440.

Fourth Application Example

Figure 9:
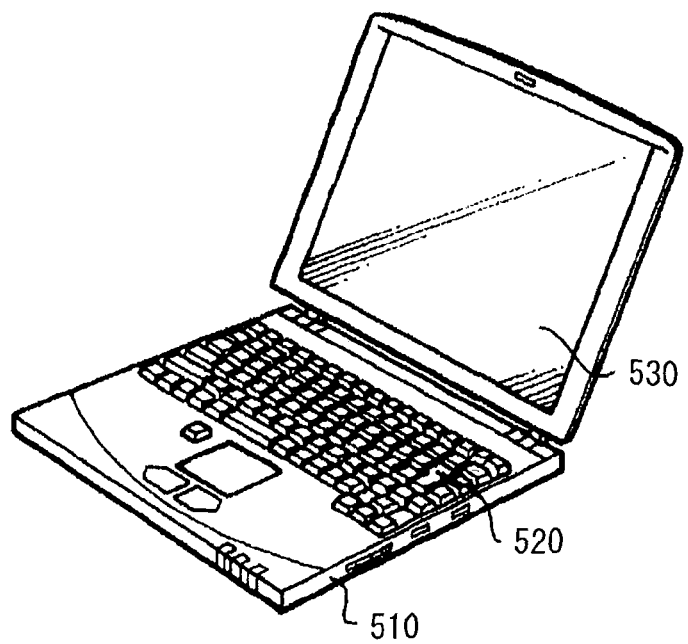
FIG. 9 is a perspective view illustrating an appearance of a fourth application example.

FIG. 9 illustrates an appearance of a notebook personal computer. The notebook personal computer has, for example, a main body 510, a keyboard 520 for operation of inputting characters and the like, and a display section 530 for displaying an image.

Fifth Application Example

Figure 10:
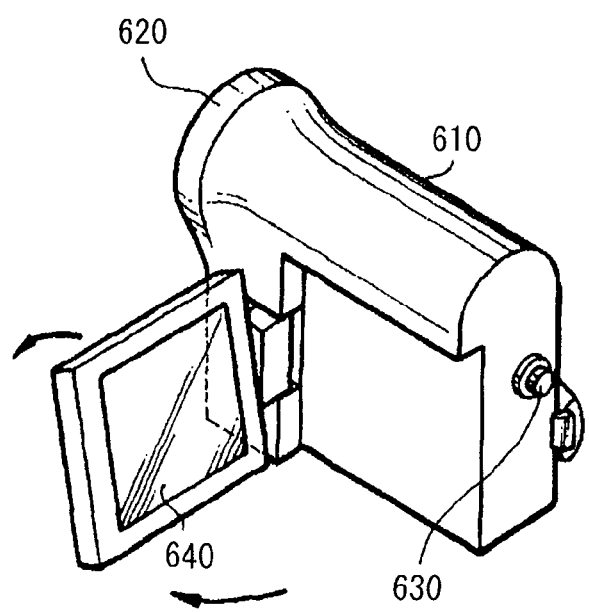
FIG. 10 is a perspective view illustrating an appearance of a fifth application example.

FIG. 10 illustrates an appearance of a video camcorder. The video camcorder includes, for example, a main body 610, a lens 620 for shooting an object provided on the front side surface of the main body 610, a start/stop switch 630 in shooting, and a display section 640.

Sixth Application Example

FIGS. 11A to 11G illustrate appearances of a mobile phone. In the mobile phone, for example, an upper package 710 and a lower package 720 are jointed by a joint section (hinge section) 730. The mobile phone includes a display 740, a sub-display 750, a picture light 760, and a camera 770.

While the present technology has been described with reference to the embodiment and the modifications, the present technology is not limited to the foregoing embodiment and the like, and various modifications may be made. For example, in the foregoing embodiment and the like, the description has been given of the electronic paper display.

However, the present technology is applicable to a liquid crystal display, an organic EL (electroluminescence) display, or an inorganic EL display.

Further, in the foregoing embodiment and the like, the description has been given of the case in which the trench 10A is provided on the inner side (sealing region 10-2 side) and the rib 10B is provided on the outer side. However, arrangement thereof may be opposite thereto. Further, the step section 10-3 may include only the trench 10A or only the rib 10B.

In addition, the material, the thickness, the film-forming method, the film-forming conditions, and the like of each layer are not limited to those described in the foregoing embodiment and the like, and other material, other thickness, other film-forming method, and other film-forming conditions may be adopted.

In addition, in the foregoing embodiment and the like, the description has been specifically given of the configurations of the displays 1 and 1A. However, it is not necessary to provide all layers, and other layer may be further provided.

It is possible to achieve at least the following configurations from the above-described exemplary embodiment and the modifications of the disclosure.

(1) A display including:
a substrate including a sealing region and a step section, the sealing region surrounding a display region, and the step section surrounding the sealing region from outside;
a display layer provided in the display region; and
a sealing section provided in the sealing region.

(2) The display according to (1), wherein the step section includes a groove and a protruded wall, the groove being provided in the substrate, and the protruded wall being protruded from a surface of the substrate.

(3) The display according to (1) or (2), wherein
the sealing region is subjected to treatment for improving wettability, and
the step section is subjected to water-repellent treatment.

(4) The display according to any one of (1) to (3), wherein the sealing region is subjected to plasma treatment.

(5) The display according to any one of (1) to (4), wherein the step section is subjected to silica-based surface treatment.

(6) The display according to any one of (1) to (5), wherein the step section includes a plurality of grooves and a plurality of protruded walls, the plurality of grooves being provided in the substrate, and the plurality of protruded walls being protruded from a surface of the substrate.

(7) An electronic unit including a display, the display including:
a substrate including a sealing region and a step section, the sealing region surrounding a display region, and the step section surrounding the sealing region from outside;
a display layer provided in the display region; and
a sealing section provided in the sealing region.

It should be understood by those skilled in the art that various modifications, combinations, sub-combinations, and alternations may occur depending on design requirements and other factors insofar as they are within the scope of the appended claims or the equivalents thereof.

What is claimed is:

1. A display, comprising:
a substrate that includes a display region, a sealing region and a step section,
wherein the sealing region surrounds the display region, and wherein the step section surrounds the sealing region from outside;
a display layer in the display region; and
a sealing section on the substrate in the sealing region,
wherein the step section includes a protruded wall that protrudes from a surface, of the substrate, on which the display layer is present, and
wherein a chemical composition of the protruded wall and a chemical composition of the surface of the substrate is same.

2. The display according to claim 1,
wherein the step section further includes a groove, and
wherein the groove is in the substrate.

3. The display according to claim 1, wherein
the sealing region is subjected to treatment that improves wettability, and
the step section is subjected to water-repellent treatment.

4. The display according to claim 3, wherein the sealing region is subjected to plasma treatment.

5. The display according to claim 3, wherein the step section is subjected to silica-based surface treatment.

6. The display according to claim 1,
wherein the step section includes a plurality of grooves and a plurality of protruded walls, and
wherein the plurality of grooves are in the substrate, and the plurality of protruded walls protrude from the surface of the substrate.

7. An electronic unit, comprising:
a display, wherein the display comprises:
a substrate that includes a display region, a sealing region and a step section, wherein the sealing region surrounds the display region, and wherein the step section surrounds the sealing region from outside;
a display layer in the display region; and
a sealing section on the substrate in the sealing region,
wherein the step section includes a protruded wall that protrudes from a surface, of the substrate, on which the display layer is present, and
wherein a chemical composition of the protruded wall and a chemical composition of the surface of the substrate is same.

* * * * *